United States Patent [19]

Gibson

[11] 4,067,519
[45] Jan. 10, 1978

[54] AUTOMATIC DRIFT CORRECTOR

[76] Inventor: Clark E. Gibson, 19700 SW. 165th Ave., Perrine, Fla. 33187

[21] Appl. No.: 683,043

[22] Filed: May 5, 1976

[51] Int. Cl.² ........................................... B64C 13/18
[52] U.S. Cl. .................................... 244/175; 33/356; 318/632
[58] Field of Search ............... 244/175, 177, 179, 184, 244/189, 82; 114/144 RE, 144 B, 144 C; 318/586, 580, 616, 618, 644, 646, 632; 46/249; 33/356

[56] References Cited

U.S. PATENT DOCUMENTS

| | | | |
|---|---|---|---|
| 2,617,615 | 11/1952 | Eschen | 318/580 |
| 2,707,602 | 5/1955 | Kauffman | 244/82 |
| 2,827,250 | 3/1958 | Rusler | 244/179 |
| 2,891,208 | 6/1959 | Hansburg | 244/179 |
| 2,945,170 | 7/1960 | Jones | 244/179 |
| 3,028,534 | 4/1962 | Chilton | 318/618 |

Primary Examiner—Trygve M. Blix
Assistant Examiner—Reinhard J. Eisenzopf
Attorney, Agent, or Firm—Oltman and Flynn

[57] ABSTRACT

An automatic drift corrector is provided for correcting the heading of an aircraft, boat, or other vehicle for drift. The drift corrector operates a synchro generator included in an automatic pilot system of the vehicle. The drift corrector includes a motor coupled to a control of the synchro generator, a variable voltage generator, a vane outside the vehicle and rotatable by drift of the vehicle to vary the voltage generator for generating a drift signal, an amplifier for applying the drift signal to the motor for causing the motor to operate the control of the synchro generator to correct for the drift, and a power supply for supplying power to the foregoing elements.

6 Claims, 4 Drawing Figures

U.S. Patent    Jan. 10, 1978    4,067,519
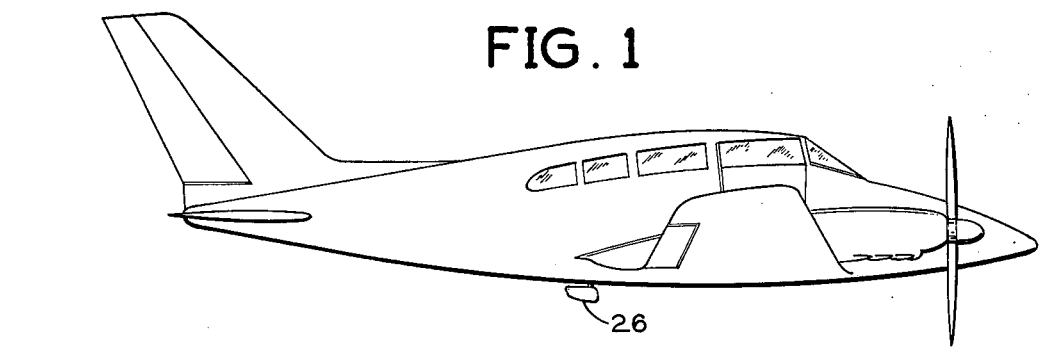
FIG. 1
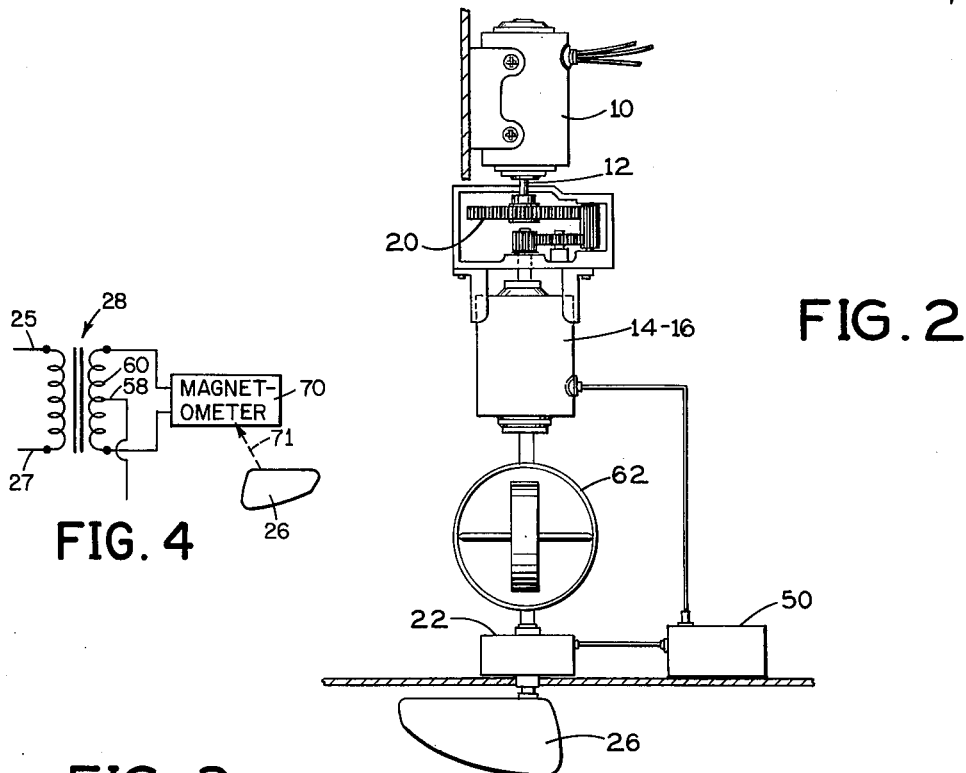
FIG. 2
FIG. 4
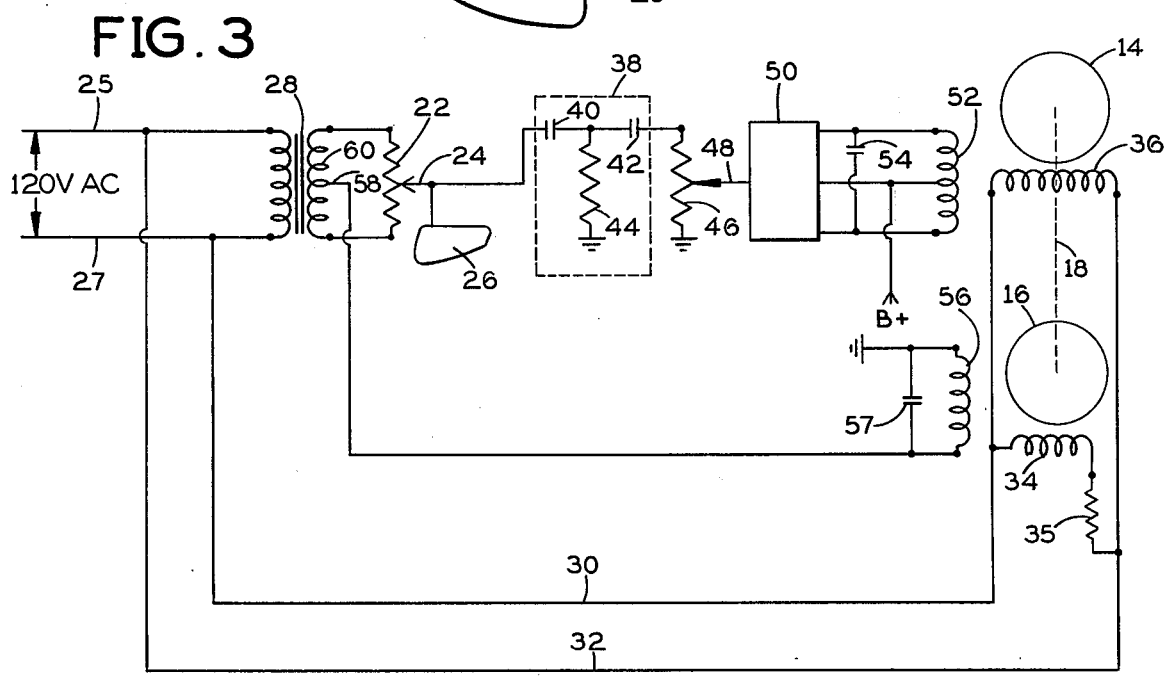
FIG. 3

AUTOMATIC DRIFT CORRECTOR

BACKGROUND OF THE INVENTION

It has been proposed to provide an aircraft or boat with an external element for sensing drift of a vehicle and operating a control to correct for the drift. Examples of such proposed systems are found in U.S. Pat. Nos. 2,834,565, 3,319,594, 3,268,187 and 2,218,272. Such known systems have been largely mechanical and unduly complicated.

SUMMARY OF THE INVENTION

The present invention is directed to an automatic drift corrector which is electrical in nature. It operates a synchro generator of an automatic pilot system to correct for drift of a vehicle. It includes a motor, a variable voltage generator, a vane rotatable by drift of the vehicle to vary the voltage generator to generate a drift signal, an amplifier for applying the drift signal to the motor for causing the motor to operate a control of the synchro generator to correct for the drift, and a power supply for supplying electric power for the system.

Accordingly, it is an object of the present invention to provide an electrial automatic drift corrector for vehicles.

Another object of the invention is to tie a drift corrector into an automatic pilot system of a vehicle.

A further object of the invention is to provide a drift corrector with a vane which causes a motor to adjust a control of the automatic pilot system of the vehicle to correct for drift.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a fragmentary perspective view of part of an aircraft showing a vane which is part of an automatic drift corrector;

FIG. 2 is a schematic diagram of an automatic drift corrector in accordance with a preferred embodiment;

FIG. 3 is a schematic diagram of a circuit for the drift corrector of FIG. 2; and FIG. 4 is a fragmentary view showing a modified part of the schematic diagram (which is otherwise the same as FIG. 3).

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The automatic drift corrector of the invention is shown in the drawings as applied to an aircraft having an automatic pilot system, but it will be understood that the automatic drift corrector can also be used on boats having an automatic pilot system. The automatic pilot system (shown only partially) includes a synchro generator 10 having a control input 12 which can be adjusted to change the heading of the vehicle. Such synchro generators are known in the art. The automatic drift corrector includes a two-field motor 14 and rate generator 16 on a common shaft 18. The motor 14 is coupled to the control input 12 of the synchro generator by reduction gearing 20 such that when the motor is operated, it will cause the synchro generator to adjust the heading of the vehicle in response to a drift signal.

The drift corrector also includes variable voltage generating means which may be a potentiometer 22 having an adjustable arm 24. Alternatively, the variable voltage generating means may be a magnetometer 70 (FIG. 4) having a movable control 71 equivalent to the adjustable arm 24.

Power is supplied to the potentiometer 22 from a 120 volt alternating current power source via lines 25 and 27 through a transformer 28. Power is also supplied from the source via lines 30 and 32 to rate generator 16 by field winding 34 and resistor 35 and to the motor 14 by field winding 36.

A vane in the form of an airfoil 26 is operatively connected mechanically to the adjustable arm 24 of the potentiometer 22 (FIG. 3) to move that arm responsive to rotation of the vane. Similarly, where the magnetometer 70 (FIG. 4) is used in place of the potentiometer, the vane is mechanically coupled to its movable control 71. The vane 26 is mounted rotatably on the outside of the aircraft so as to be out of any slipstream from a propeller or jet of the aircraft. The vane 26 will align itself with the direction of movement of the aircraft through space regardless of the direction the aircraft is pointing. If the aircraft is not drifting, the vane will align itself with the heading of the aircraft. If a drift is encountered, the vane will align itself with the direction of movement of the aircraft through space. The rotation of the vane as the result of drift causes the adjustable arm 24 to move from its centered position, and this causes the potentiometer 22 to produce a drift signal which is related in amplitude to the rate of drift of the aircraft and is related in polarity to the direction of drift.

The drift signal is supplied from the potentiometer 22 to a phase shifting network 38 composed of capacitors 40 and 42 and resistors 44 and 46. The values of the latter components are selected to shift the phase of the drift signal by 90°. Resistor 46 has a movable tap 48 for applying the phase-shifted drift signal to the servo-amplifier 50 and for adjusting gain. The servo-amplifier 50 is coupled to the motor's field winding 52 which is tuned by a capacitor 54.

A rate feedback signal is received from the rate generator 16 by a grounded winding 56 which is connected to a center tap 58 on the secondary winding 60 of the transformer 28. Winding 56 is tuned by capacitor 57.

In operation, any drift of the aircraft causes the vane 28 to rotate, thus adjusting the arm 24 of potentiometer 22 away from its center position. The potentiometer 22 develops a drift signal which is applied through phase shift network 38 to the servo-amplifier 50. The drift signal is amplified by the servo-amplifier 50 and applied to the winding 52 of the two-field motor 14. The motor rotates, thus adjusting the control input 12 of the synchro generator which in turn causes the automatic pilot system to correct the heading of the aircraft for the drift. The polarity of the drift signal determines the direction of rotation of the motor, and the magnitude of the drift signal determines the speed of rotation of the motor.

The motor 14 is on a common shaft 18 with the rate generator 16, so rotation of the motor 14 also rotates the rate generator 16. A feedback signal is developed across winding 56 and is fed to the transformer 60 for stabilizing the system to inhibit hunting.

When the drift ceases, the aircraft will return to its position in alignment with the vane, the arm 24 of potentiometer 22 will return to its centered position, and no drift signal will be developed.

A gyroscope 62 of the automatic pilot system is shown in FIG. 2 for the purpose of illustrating that the automatic drift corrector system may be physically mounted on the gyroscope. However, it will be understood that the gyroscope does not electrically control the automatic drift corrector.

Having thus described my invention, I claim:

1. In a vehicle having an automatic pilot system including a synchro generator means having a control for adjusting the heading of the vehicle, and vane means mounted rotatably outside the vehicle to follow the forward movement of the vehicle, an automatic drift corrector comprising:

two-field electric motor means coupled to said control of said synchro generator means by reduction gear means for causing said synchro generator means to adjust the heading of the vehicle in response to a drift signal;

variable voltage generating means for developing the drift signal;

said vane means being coupled to said variable voltage generating means to vary the same in response to rotation of said vane means by drift of the vehicle for generating said drift signal;

servo amplifier means coupled between said variable voltage generating means and said electric motor for amplifying said drift signal and applying the same to said motor for causing said motor to operate said synchro generator means to correct for said drift; and power supply means for supplying electrical power to said motor means, said voltage generator means and said amplifier means.

2. The automatic drift corrector as claimed in claim 1 including:

rate generator means connected to said motor means for generating a feedback signal related in amplitude to the rate of said drift; and means for applying said feedback signal to said servo amplifier means for stabilizing the same to inhibit hunting thereof.

3. The automatic drift corrector as claimed in claim 2 in which said vane means comprises an airfoil.

4. The automatic drift corrector as claimed in claim 3 in which:

said variable voltage generating means comprises a variable magnetometer having a movable control coupled mechanically to said vane means.

5. The automatic drift corrector as claimed in claim 3 in which:

said variable voltage generating means comprises a potentiometer having a movable control coupled mechanically to said vane means.

6. The automatic drift corrector as claimed in claim 5 in which:

said variable voltage generator means also includes a phase shift network for shifting the phase of said drift signal relative to the power from said power supply means.

* * * * *